United States Patent
Otobe et al.

(10) Patent No.: US 6,842,965 B2
(45) Date of Patent: Jan. 18, 2005

(54) METHOD FOR MANUFACTURING A STRAIN DETECTOR

(75) Inventors: Toshirou Otobe, Fukui (JP); Takashi Kawai, Fukui (JP); Yukio Mizukami, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 272 days.

(21) Appl. No.: 10/186,624

(22) Filed: Jul. 2, 2002

(65) Prior Publication Data

US 2003/0000073 A1 Jan. 2, 2003

Related U.S. Application Data

(62) Division of application No. 09/749,756, filed on Dec. 28, 2000, now Pat. No. 6,761,073.

(51) Int. Cl.[7] ............................................. G01R 3/00
(52) U.S. Cl. .................. 29/595; 29/25.42; 29/592.1; 29/620; 29/621.1; 29/841; 29/854; 73/766; 73/777; 427/79; 427/96; 427/108; 427/125
(58) Field of Search ............................. 29/592.1, 595, 29/620, 621.1, 841, 854, 25.42; 73/766, 777; 427/79, 96, 108, 125

(56) References Cited

U.S. PATENT DOCUMENTS

| | | | |
|---|---|---|---|
| 4,945,770 A | 8/1990 | Alvelid et al. ................ 73/768 |
| 5,242,722 A | * 9/1993 | Hiraka et al. ............... 428/34.6 |
| 5,406,852 A | * 4/1995 | Hiraka et al. .................. 73/721 |
| 5,824,895 A | * 10/1998 | Itsuji et al. ............... 73/204.17 |

FOREIGN PATENT DOCUMENTS

| JP | 03111750 A | * 5/1991 | .......... G01N/27/07 |
|---|---|---|---|
| JP | 03210468 A | * 9/1991 | .......... G01N/27/12 |
| JP | 8-87375 | 4/1996 | |
| JP | 2000-180255 | 6/2000 | |

OTHER PUBLICATIONS

Calibration technique for MEMS membrane type strain sensors; Li Cao; Tae Song Kim; Jia Zhou; Mantell, S.C.; Polla, D.L.; University/Government/Industry Microelectronics Symposium; Jun. 20–23, 1999; pp. 204–210.*

* cited by examiner

Primary Examiner—A. Dexter Tugbang
Assistant Examiner—Paul D Kim
(74) Attorney, Agent, or Firm—Wenderoth, Lind & Ponack, L.L.P.

(57) ABSTRACT

A strain detector where water does not reach a strain-resistance element and which supplies stable output at all times is provided. In the strain detector, a first protective layer made of glass is disposed to cover an insulating substrate and the strain-resistance element. A second protective layer made of resins or glass for covering the first protective layer, and a thermistor for compensating the resistance of the strain-resistance element are disposed.

40 Claims, 8 Drawing Sheets

METHOD FOR MANUFACTURING A STRAIN DETECTOR

This application is a divisional application of Ser. No. 09/749,756 filed Dec. 28, 2000, now U.S. Pat. No. 6,761,073.

FIELD OF THE INVENTION

The present invention relates to a strain detector for detecting a strain resulting from a load.

BACKGROUND OF THE INVENTION

Japanese Patent Laid Open Publication No. 8-87375 discloses a conventional strain detector. The conventional strain detector will be described with reference to drawings hereinafter. FIG. 8 is a top view of the conventional strain detector, and FIG. 9 is a cross sectional side view of the detector.

In FIG. 8 and FIG. 9, insulating substrate 1 made of elastic material is formed by disposing stick member 2 and insulating layer 3 thereon. Four strain-resistance elements 4 are disposed over insulating substrate 1. Strain-resistance elements 4 are electrically coupled to a pair of power electrodes 5, a pair of output electrodes 6, and a pair of ground (GND) electrodes 7 to form a bridge circuit. Protective layer 8 made of resins covers elements 4, power electrodes 5, the pair of output electrodes 6, the pair of GND electrodes 7 and the rest of insulating substrate 1.

The operation of the above conventional strain detector will be described hereinafter.

When a shearing load is applied on the general-center position of the top of insulating substrate 1, a bending moment occurs in insulating substrate 1 via the shearing load and also occurs in the four strain-resistance elements 4 disposed over substrate 1. A resistance of strain-resistance elements 4 changes by the bending moment resulting in elements 4. A change of the resistance is supplied from the pair of output electrodes 6 to an external measuring device (not shown), and then the load on substrate 1 is measured.

In the conventional strain detector, only protective layer 8 made of resins is disposed over insulating substrate 1, the pair of power electrodes 5, the pair of output electrodes 6 and the pair of GND electrodes 7. Protective layer 8 made of resins absorbs water little by little. Therefore, when the strain detector is used for a long time in an atmosphere of high humidity, the water reaches strain-resistance elements 4 and the resistance of strain-resistance elements 4 fluctuates.

SUMMARY OF THE INVENTION

The present invention provides a strain detector, where water does not reach strain-resistance elements, such that stable output properties are at all times exhibited.

The strain detector comprises:

(a) An insulating substrate made of elastic materials;

(b) Four strain-resistance elements, which form a bridge circuit by being electrically coupled to a power electrode, a pair of output electrodes, and a ground (GND) electrode, disposed over the insulating substrate;

(c) A temperature-characteristic-compensation element disposed over the insulating substrate; and (d) A first protective layer for covering the insulating substrate, the strain-resistance elements, the power electrode, the pair of output electrodes, the GND electrode and a temperature-characteristic-compensating element.

DESCRIPTION OF THE PREFERRED EMBODIMENT

Figure 1:
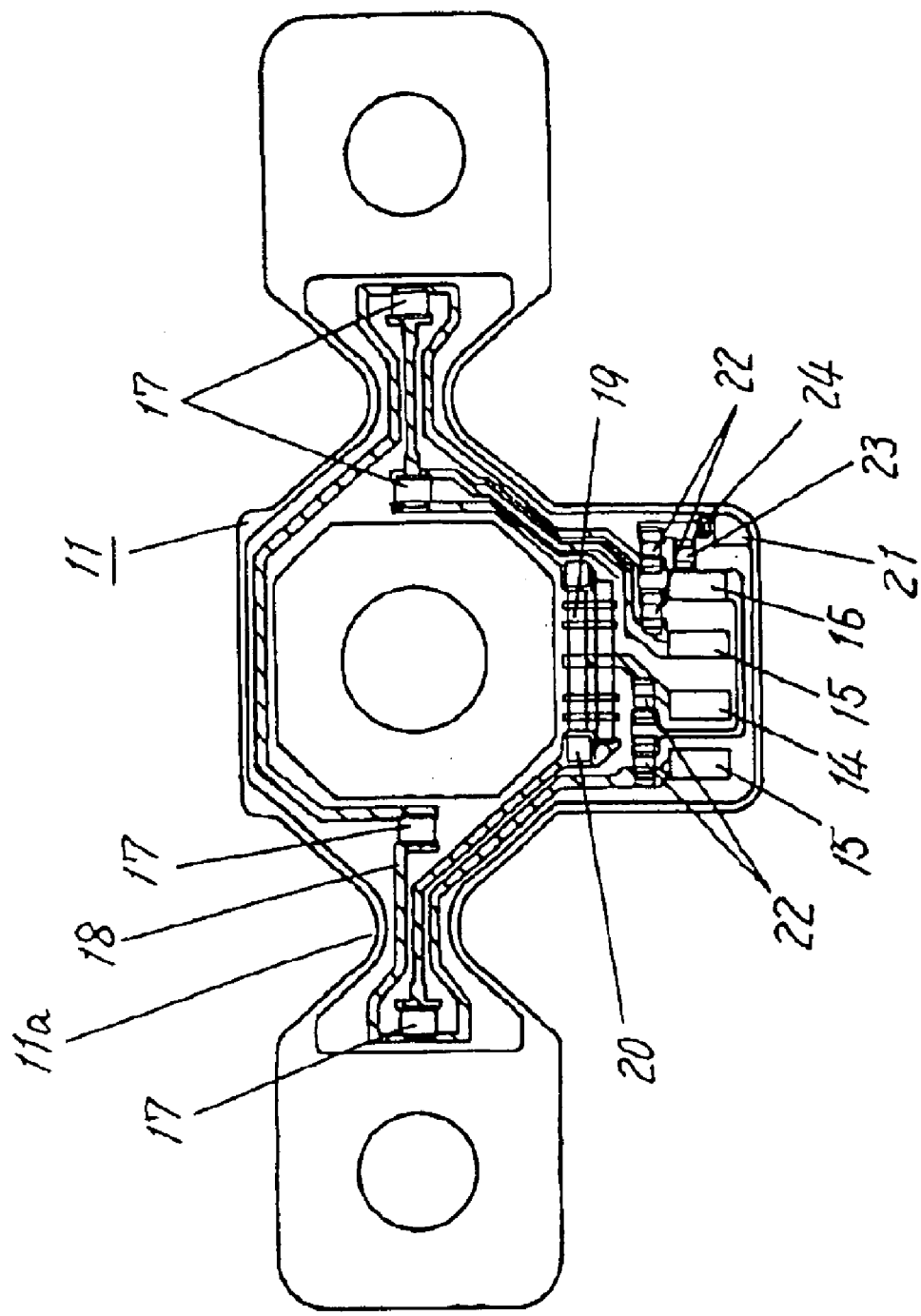
FIG. 1 is a top view of a strain detector in accordance with an exemplary embodiment of the present invention.
Figure 2:
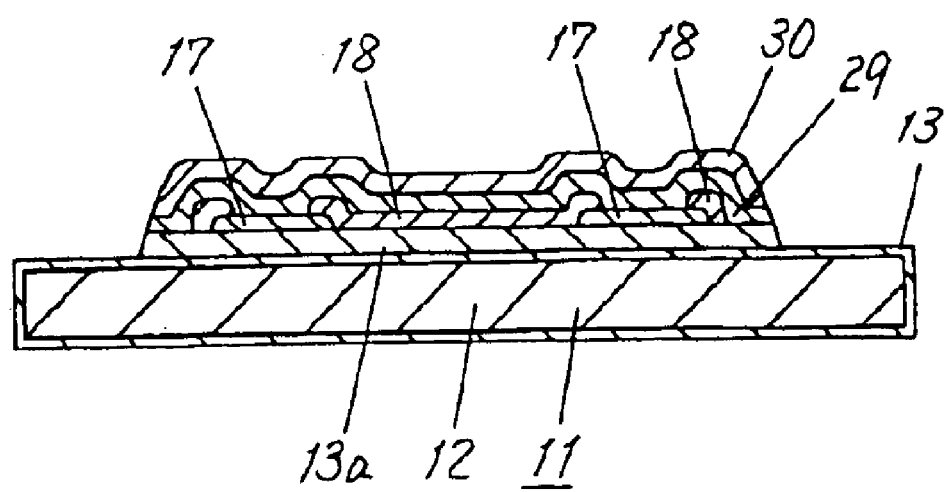
FIG. 2 is a cross sectional side view of the strain detector at a position of the strain-resistance elements disposed therein in accordance with the exemplary embodiment of the invention.
Figure 3:
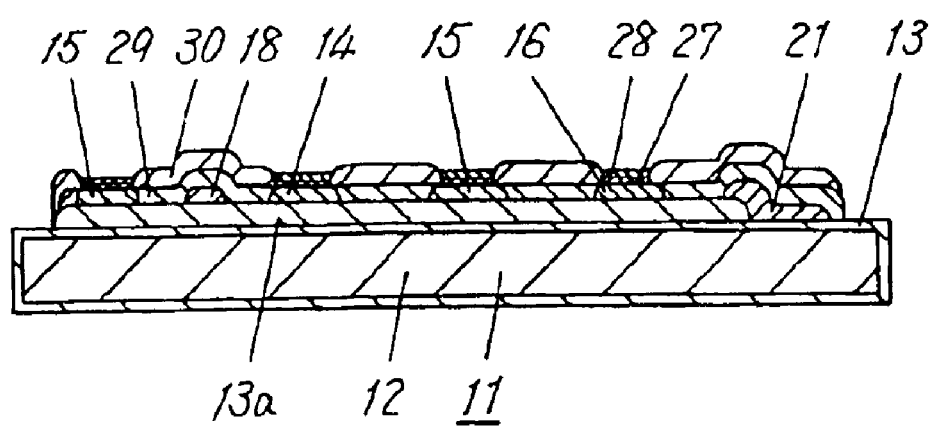
FIG. 3 is a cross sectional view of the strain detector at a position of electrodes disposed therein in accordance with the exemplary embodiment of the invention.
Figure 4:
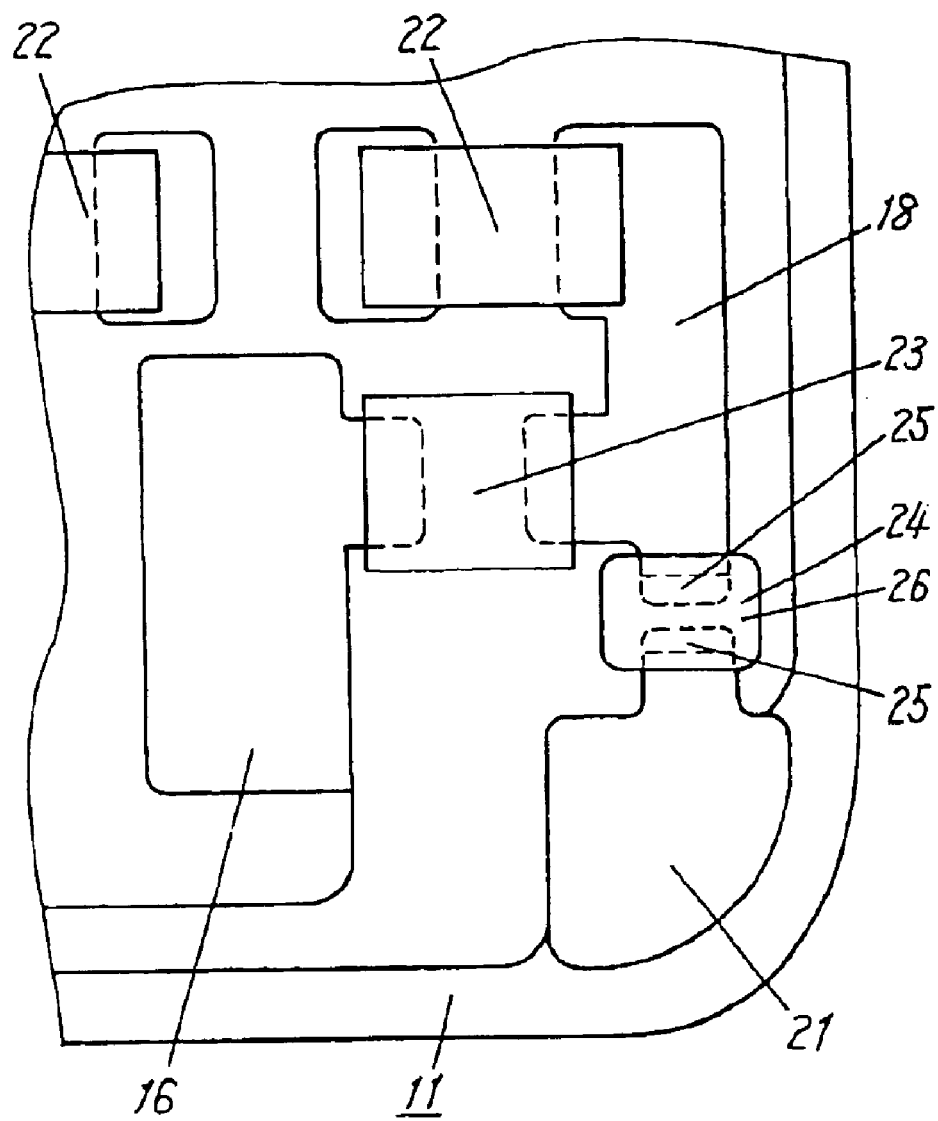
FIG. 4 is a top view showing a conductive adhesive disposed in a slit section of an insulating substrate in the strain detector in accordance with the exemplary embodiment of the invention.

FIG. 1 is a top view of a strain detector in the embodiment of the present invention. FIG. 2 is a cross sectional side view of the strain detector at a position of the strain-resistance elements disposed therein. FIG. 3 is a cross sectional side view of the strain detector at a position of electrodes disposed therein. FIG. 4 is a top view showing a state of a conductive adhesive disposed in a slit section of the insulating substrate.

In FIG. 1 through FIG. 4, insulating substrate 11 is made of elastic materials and comprises stainless steel board 12 containing aluminum, protective coat 13 made of alumina disposed over board 12, and insulating layer 13a made of glass disposed over coat 13. Power electrode 14, a pair of output electrodes 15, and ground (GND) electrode 16, which are made of silver, and strain-resistance elements 17 are electrically coupled to each other via circuit pattern 18 to form a bridge circuit. Moreover, temperature-characteristic adjusting resistor 19 used as a temperature compensation element is disposed over substrate 11. One end of resistor 19 is electrically coupled to GND electrode 16 and the other end is coupled to strain-resistance elements 17 via a pair of resistance-measuring electrodes 20. Capacitor 22 is coupled to static-electricity-discharging resistor 23 in parallel between frame ground (GND) electrode 21 and GND electrode 16 disposed over board 12 via circuit pattern 18. Slit 24 is disposed in circuit pattern 18 on insulating substrate 11 so that slit 24 cuts off circuit pattern 18 partially, and a pair of slit electrodes 25 which are made of silver and electrically coupled to circuit pattern 18 is disposed at a position of slit 24. Conductive adhesive 26 electrically connects the pair of slit electrodes 25 to each other. First plate layer 27 made of nickel is disposed over power electrode 14, the pair of output electrodes 15, and GND electrode 16. Second plate layer 28 made of solder is disposed over first plate layer 27. Four strain-resistance elements 17 are arranged in pairs over insulating substrate 11, moreover, constriction section 11a is disposed between elements 17 of each pair in substrate 11. First protective layer 29 made of glass covers insulating substrate 11, power electrode 14, the pair of output electrodes 15, GND electrode 16, and temperature-characteristic adjusting resistor 19. Second protective layer 30 made of resins or glass covers first protective layer 29. Capacitors 22 are coupled between power electrode 14 and GND electrode 16 and coupled between output electrode 15 and GND electrode 16 respectively.

A manufacturing method of the above detector will be described below.

First, insulating substrate 11 is formed by previously printing glass paste over stainless steel board 12 containing aluminum and by baking at about 850° C. for about 10 minutes.

Then, metal-glaze based paste is printed where strain-resistance elements 17 and static-electricity-discharging resistor 23 are to be disposed over substrate 11, and dried at about 130° C. for about 10 minutes.

Then, thermistor-resistance-paste is printed at a position where temperature-characteristic-adjusting resistor 19 is to be disposed over insulating substrate 11. And then, four resistance elements 17, static-electricity charging resistor 23 and resistor 19 are formed by baking at about 850° C. for 10 minutes.

Then, power electrode 14, the pair of output electrodes 15, GND electrode 16, resistance-measuring electrodes 20, circuit pattern 18, frame GND electrode 21 and slit electrodes 25 are formed by printing silver paste over insulating substrate 11 and by baking at about 600° C. for 10 minutes.

At this time, stainless steel board 12 containing aluminum is not oxidized by the baking because of the high heat stability of protective coat 13 made of alumina formed over board 12. Consequently, elastic properties of substrate 11 become stable, and then the output of the strain detector becomes stable.

Then, first protective layer 29 is formed by printing a paste of glass over substrate 11 but not over power electrode 14, the pair of output electrodes 15, GND electrode 16, resistance-measuring electrodes 20 and slit electrodes 25, and then by baking at about 600° C. for 10 minutes.

Then, the pair of temperature-characteristic-adjusting resistors 19 are trimmed so that the pair of output electrodes 15 can output the same amount of changes according to a change of a temperature surrounding substrate 11 under the condition that a voltage is applied to power electrode 14 coupled to a power supply while GND electrode 16 is grounded.

Then, second protective layer 30 is formed by printing a paste of resins or glass over first protective layer 29 disposed over substrate 11 and by baking at about 200° C. for 30 minutes.

Then, first plate layer 27 made of nickel is formed over power electrode 14, the pair of output electrodes 15, and GND electrode 16. Then, second plate layer 28 made of solder is formed over first plate layer 27. Slit 24 for partially breaking circuit pattern 18 is formed, and further, conductive adhesive 26 is disposed at slit 24. Namely, first plate layer 27 and second plate layer 28 are formed over power electrode 14, the pair of output electrodes 15, and GND electrode 16 under the condition of electrically disconnecting stainless steel board 12 from power electrode 14, the pair of output electrodes 15, and GND electrode 16. Therefore, partially exposed stainless steel board 12 is not plated. As each electrode becomes stable, the amount of plating in each electrode become stable. Conductive members such as jumpers can be employed instead of the conductive adhesive.

Then, conductive adhesive 26 is painted over slit 24 and the end of circuit pattern 18 adjacent to slit 24 over substrate 11.

Then, capacitor 22, for coupling both circuit patterns, coupled to power electrode 14 and GND electrode 16, respectively, is mounted and is soldered to circuit pattern 18.

Also, capacitor 22 for coupling both circuit patterns of output electrodes 15 and GND electrode 16 is mounted and soldered to circuit pattern 18.

Then, capacitor 22 and discharging resistor 23 for coupling circuit pattern 18, connected to frame GND electrode 21, and GND electrode 16, are mounted and soldered to circuit pattern 18.

The operation of the strain detector assembled above will be described below.

When a shearing load is applied on the general-center position of insulating substrate 11, a strain occurs on the surface of substrate 11 by the load, and also a strain occurs in the four strain-resistance elements 17. When the strain occurs in strain-resistance elements 17, resistance of each element 17 changes. The change of the resistance is supplied to a measuring device (not shown), such as an external computer, from the pair of output electrodes 15, and then, the load on substrate 11 is determined.

In this strain detector, second protective layer 30 made of resins or glass covers first protective layer 29 made of glass. Therefore, even when water flows through second protective layer 30 because of using the detector in a high humidity atmosphere for a long time, the water does not penetrate through first protective layer 29 made of glass. Consequently, as water does not reach strain-resistance elements 17, the resistance of strain-resistance elements 17 does not fluctuate, and the strain detector from which can be obtained a stable output at all times is provided.

If second protective layer 30 is made of resins, it is baked at a relatively lower temperature of about 200° C. Therefore, the resistance of strain-resistance elements 17 and temperature-characteristic-adjusting resistor 19 hardly change while second protective layer 30 is being baked.

In this strain detector, temperature-characteristic-adjusting resistor 19 is disposed over insulating substrate 11; however, thermistor 31 may be disposed over substrate 11 instead of resistor 19. When thermistor 31 is disposed, it can measure a temperature of substrate 11. Even if the resistance of strain-resistance elements 17 changes because of using the detector in a temperature-changing atmosphere, the measuring device such as a computer (not shown) can compensate for the change of the resistance of elements 17. Consequently, the load on the strain detector can be exactly detected when a compensation-value calculator such as an IC chip for the compensation is mounted on the insulating substrate 11. Wiring to an external measuring device becomes simple, and a load on the measuring device is reduced.

Figure 5:
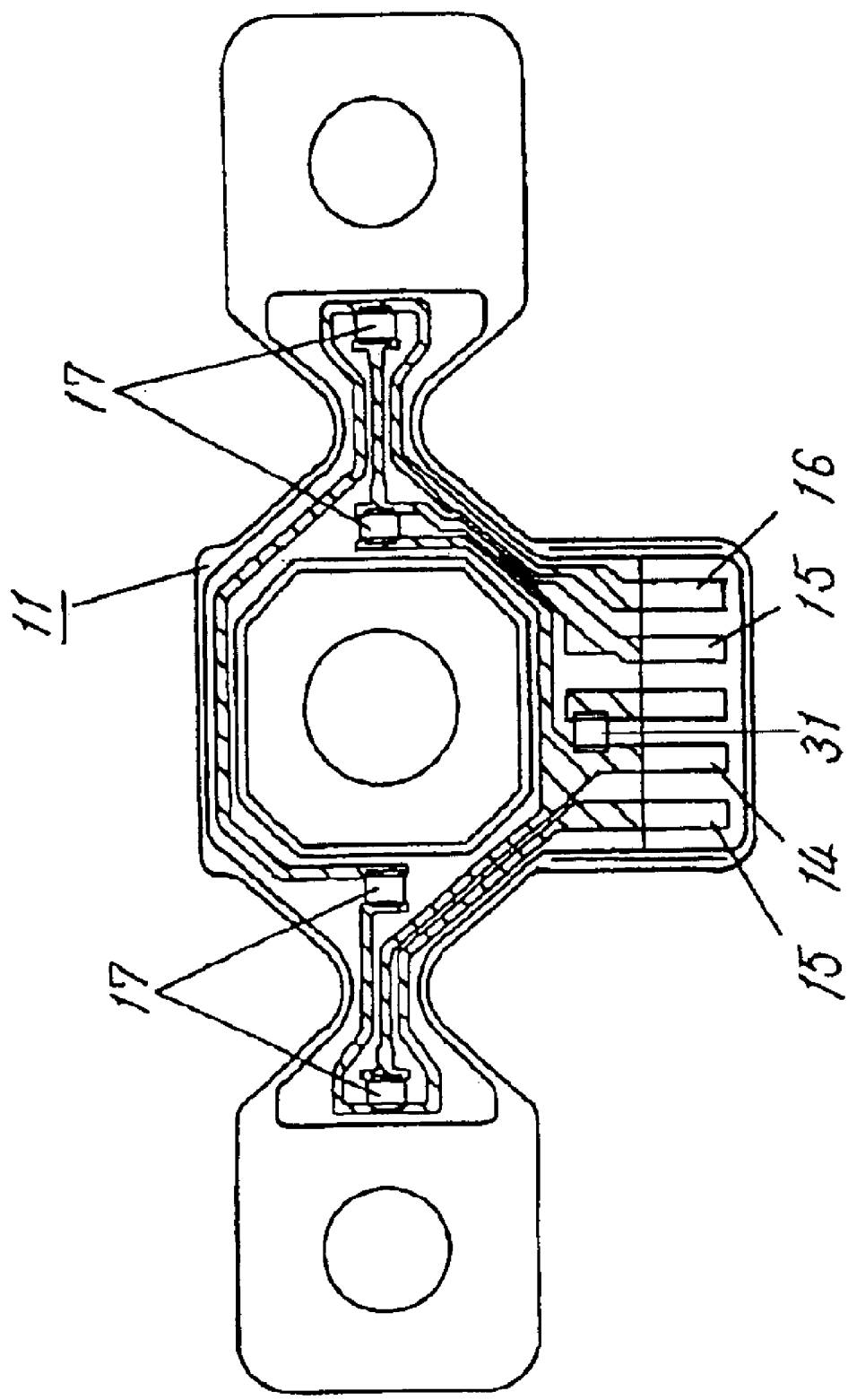
FIG. 5 is a top view of the strain detector in accordance with the exemplary embodiment of the invention.

The thermistor 31 is formed over substrate 11 in the same way as resistor 19. Or, as shown in FIG. 5, thermistor 31 can be mounted on substrate 11 in the same way as capacitor 22. In FIG. 5, thermistor 31 is coupled to power electrode 14; however, thermistor 31 can be coupled to GND electrode 16 or floated by itself.

Figure 6:
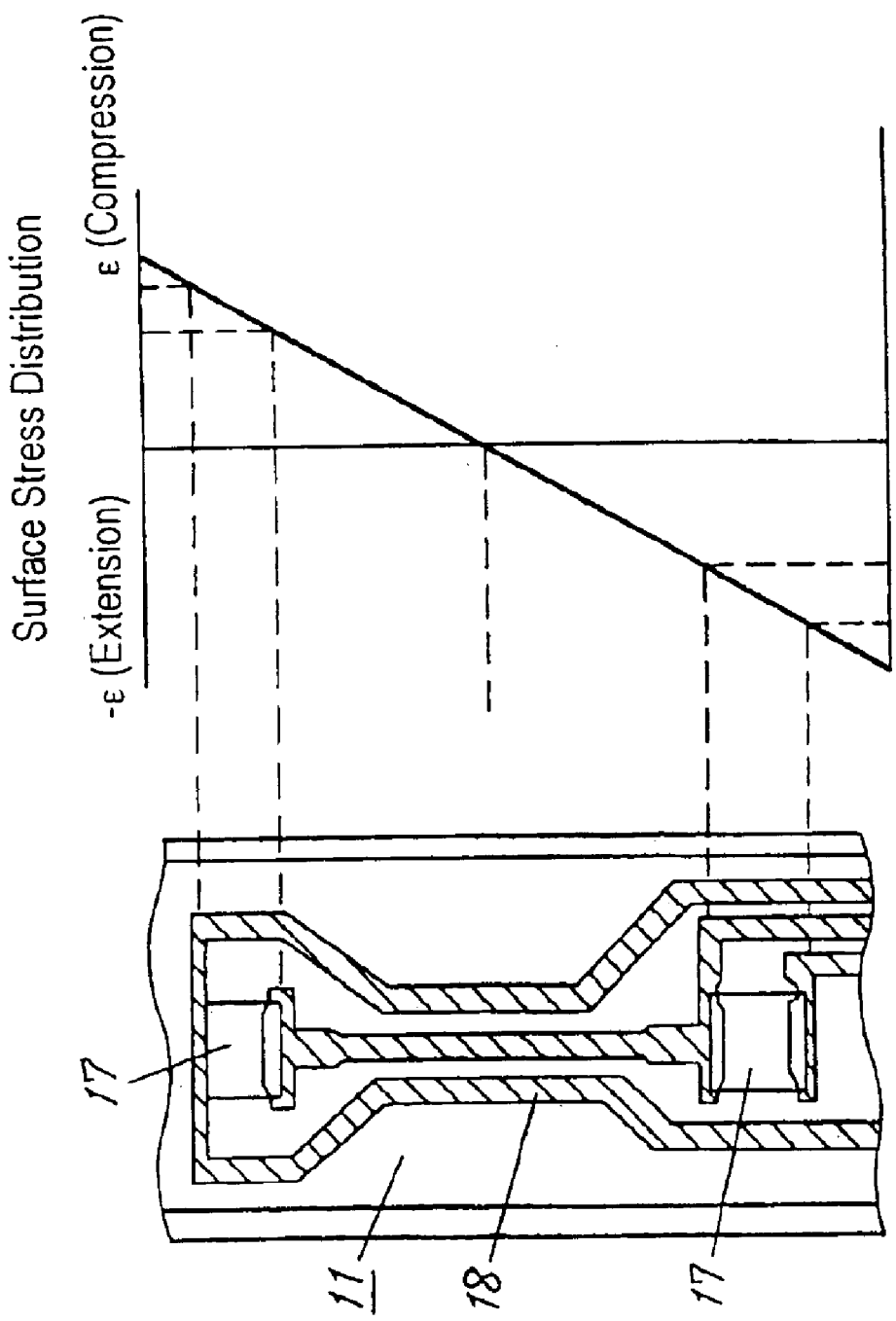
FIG. 6 shows a distribution of a stress occurring in a rectangular insulating substrate in accordance with the exemplary embodiment of the invention.
Figure 7:
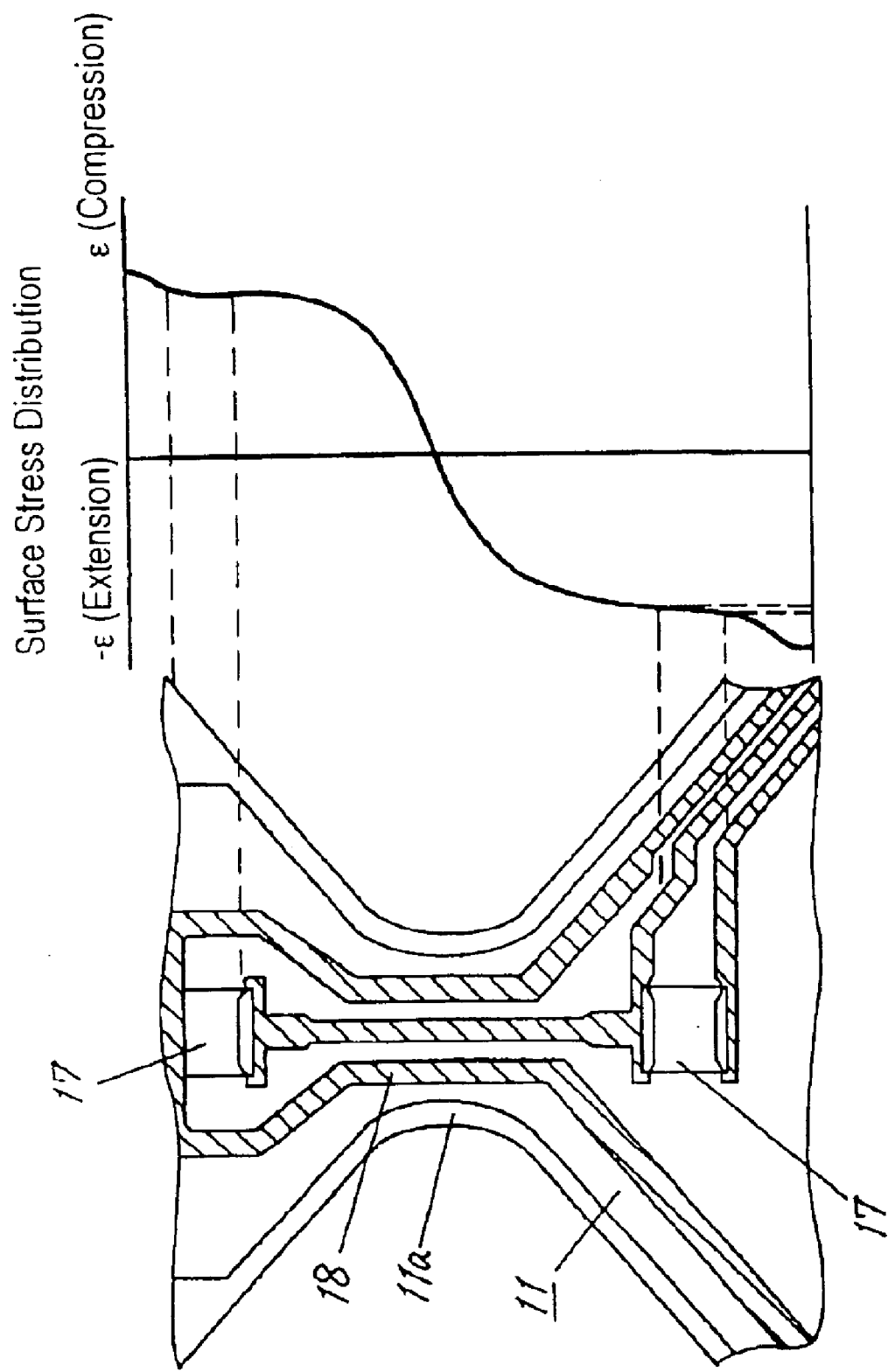
FIG. 7 shows a distribution of a stress occurring in the insulating substrate of the strain detector having a constriction section in the insulating substrate in accordance with the exemplary embodiment of the invention.
Figure 8:
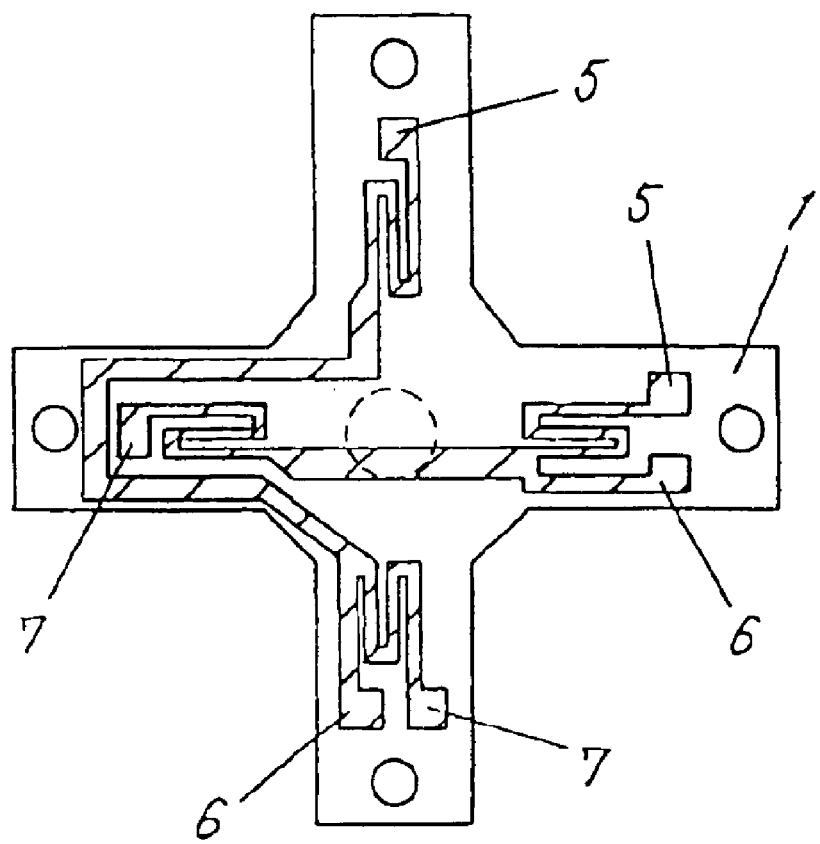
FIG. 8 is a top view of a conventional strain detector.
Figure 9:
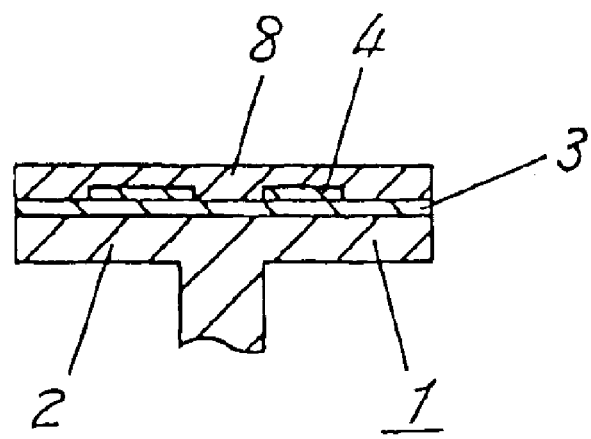
FIG. 9 is a cross sectional side view of the conventional strain detector.

FIG. 6 shows an analyzed strain on insulating substrate 11. When substrate 11 is rectangular like the conventional strain detector, bending strain concentrates at the end of substrate 11. The elastic coefficient of substrate 11 therefore deteriorates. In the strain detector of the embodiment, constriction section 11a is disposed between strain-resistance elements 17 of each pair on substrate 11. Therefore, when a load is applied on the general-center position of the strain detector, a strain on the surface of substrate 11 is spread toward constriction section 11a from the end of substrate 11 as shown in FIG. 7. The strain does not concentrate accordingly into the end of substrate 11, and strain-resistance elements 17 can be placed at a wide area on substrate 11. And then, an assembling efficiency is improved.

For the case that static electricity more than 5 kv is applied to GND electrode 16 by touching it with a hand, the conventional strain detector requires a structure such that static electricity cannot be applied to the GND electrode. That is because the insulating layer over the substrate may break down. In the strain detector in the embodiment, frame GND electrode 21, which is disposed over stainless steel board 12 and electrically coupled thereto, is electrically coupled to GND electrode 16. Consequently, static electricity runs through frame GND electrode 21 and to the GND electrode 16 via stainless steel board 12. Even when static electricity is applied to the GND electrode 16, insulating layer 13a can be prevented from breaking down.

In the strain detector in the embodiment, a discharge element, which includes capacitor 22 and static-electricity-discharging resistor 23 connected in parallel, is coupled between frame GND electrode 21 and GND electrode 16. Therefore, even if static electricity is applied to GND electrode 16, capacitor 22 absorbs the electricity. As a result, the static electricity is controlled within a low voltage, and insulating layer 13a can be prevented from breaking down. When resistor 23 discharges the accumulated electrical charge, GND electrode 16 and frame GND electrode 21 reach the same potential. As stainless steel board 12 is not directly coupled to GND electrode 16, the potential of GND electrode 16 does not fluctuate, and output signals from the output electrodes 15 become stable.

In the strain detector in the embodiment, when the static electricity is applied to power electrode 14 or output electrodes 15, for example, by touching with a hand, capacitors 22 absorb an electric charge of the electricity because capacitors 22 are coupled between power electrode 14 and GND electrode 16, and between each of the pair of output electrodes 15 and GND electrode 16, respectively. Therefore, as the static electricity is controlled within a low voltage, and excessive current does not run through strain-resistance elements 17, the resistance of strain-resistance elements 17 becomes stable.

In the embodiment, the strain detector having the temperature-characteristic-adjusting resistor, the slit, the conductive members or the static-electricity-discharging element is described as shown in FIG. 1. The same factors can be additively disposed in the detector having a thermistor as shown in FIG. 5.

In the strain detector in the embodiment, first plate layer 27 made of nickel is formed over power electrode 14, GND electrode 16, and output electrodes 15, and also, second plate layer 28 made of solder is formed over first plate layer 27. Therefore, silver does not move from each electrode to second plate layer 28. As a result, the electric connections between each electrode and a terminal of an external device becomes further reliable.

What is claimed is:

1. A method of manufacturing a strain detector, comprising:

applying a metal-glaze-based paste over an insulating substrate at a position where a strain-resistance element is to be disposed;

forming the strain-resistance element at said position;

forming a power electrode, output electrodes, a ground electrode, and a circuit pattern over said insulating substrate;

disposing a temperature-characteristic-compensation element over said insulating substrate;

forming a first protective layer over said strain-resistance element; and forming a frame ground electrode by coating said insulating substrate with silver paste.

2. The method according to claim 1, wherein applying the metal-glaze-based paste over the insulating substrate comprises printing the metal-glaze-based paste over the insulating substrate, forming the strain-resistance element at said position comprises applying a thermistor-resistance paste at said position, forming the power electrode, the output electrodes, the ground electrode, and the circuit pattern over said insulating substrate comprises coating said insulating substrate with silver paste to form the power electrode, a pair of output electrodes, the ground electrode and the circuit pattern, and forming the first protective layer over said strain-resistance element comprises applying a glass paste as the first protective layer.

3. The method according to claim 2, further comprising:

providing said insulating substrate by
(i) forming a protective alumina layer over a stainless steel board that contains aluminum, and
(ii) forming an insulating layer by coating said protective alumina layer with a glass paste.

4. The method according to claim 3, further comprising:

mounting a capacitor and a static-electricity-discharging resistor for coupling said frame ground electrode to said ground electrode.

5. The method according to claim 4, wherein disposing the temperature-characteristic-compensation element over said insulating substrate further comprises baking said thermistor-resistance paste at about 850° C. for about 10 minutes so as to form a temperature-characteristic-adjusting resistor as said temperature-characteristic-compensation element.

6. The method according to claim 3, wherein forming the insulating layer further comprises baking said glass paste at about 850° C. for about 10 minutes.

7. The method according to claim 3, wherein forming the frame ground electrode further comprises baking said silver paste at about 600° C. for about 10 minutes.

8. The method according to claim 2, wherein disposing the temperature-characteristic-compensation element over said insulating substrate comprises applying thermistor-resistance paste over said insulating substrate at a position where said temperature-characteristic-compensation element is to be disposed so as to form a temperature-characteristic-adjusting resistor as said temperature-characteristic-compensation element.

9. The method according to claim 8, further comprising:

coupling a direct-current power source between said power electrode and said ground electrode; and trimming said temperature-characteristic-adjusting resistor such that said pair of output electrodes each outputs the same amount of change corresponding to a change of a temperature surrounding said insulating substrate.

10. The method according to claim 2, wherein
disposing the temperature-characteristic-compensation element over said insulating substrate comprises applying thermistor-resistance paste over said insulating substrate at a position where said temperature-characteristic-compensation element is to be disposed so as to form a thermistor as said temperature-characteristic-compensation element.

11. The method according to claim 10, further comprising:
mounting a compensation-value calculator over said insulating substrate for compensating an output of said strain-resistance element based on an output of said thermistor.

12. The method according to claim 10, wherein
disposing the temperature-characteristic-compensation element over said insulating substrate further comprises baking said thermistor-resistance paste at about 130° C. for about 10 minutes so as to form a thermistor as said temperature-characteristic-compensation element.

13. The method according to claim 2, further comprising:
forming a second protective layer over said first protective layer.

14. The method according to claim 13, wherein
forming the second protective layer over said first protective layer comprises coating said first protective layer with one of a resin paste and a glass paste.

15. The method according to claim 14, wherein
forming the second protective layer over said first protective layer further comprises baking said one of a resin paste and a glass paste at about 200° C. for about 30 minutes.

16. The method according to claim 2, further comprising:
forming a nickel plate layer over said power electrode, said pair of output electrodes and said ground electrode; and
forming a solder plate layer over said nickel plate layer.

17. The method according to claim 16, further comprising:
forming a slit by cutting off a portion of said circuit pattern prior to forming said nickel plate layer;
forming a slit electrode at said slit by coating said circuit pattern with silver paste prior to forming said nickel plate layer; and
disposing a conductive member on said slit electrode after forming said nickel plate layer.

18. The method according to claim 17, wherein
disposing the conductive member on said slit electrode comprises applying a conductive adhesive on said slit electrode.

19. The method according to claim 2, wherein
disposing the temperature-characteristic-compensation element over said insulating substrate comprises mounting a thermistor over said insulating substrate.

20. The method according to claim 19, further comprising:
mounting a compensation-value calculator over said insulating substrate for compensating an output of said strain-resistance element based on an output of said thermistor.

21. The method according to claim 2, further comprising:
mounting a capacitor for coupling said power electrode to said ground electrode; and
mounting capacitors for coupling said pair of output electrodes to said ground electrode, respectively.

22. The method according to claim 2, wherein
forming the strain-resistance element at said position further comprises drying said thermistor-resistance paste at said position for about 10 minutes at 130° C.

23. The method according to claim 2, wherein
forming the power electrode, the output electrodes, the ground electrode, and the circuit pattern over said insulating substrate further comprises baking said silver paste at about 600° C. for about 10 minutes to form said power electrode, said pair of output electrodes, said ground electrode and said circuit pattern.

24. The method according to claim 2, wherein
forming the first protective layer over said strain-resistance element further comprises baking said glass paste at about 600° C. for about 10 minutes.

25. The method according to claim 1, further comprising:
forming a second protective layer over said first protective layer.

26. The method according to claim 25, wherein
forming the first protective layer over said strain-resistance element comprises applying a glass paste as the first protective layer, and
forming the second protective layer over said first protective layer comprises coating said first protective layer with one of a resin paste and a glass paste.

27. A method of manufacturing a strain detector, comprising:
applying a metal-glaze-based paste over an insulating substrate at a position where a strain-resistance element is disposed;
forming the strain-resistance element at said position;
forming a power electrode, output electrodes, a ground electrode and a circuit pattern over said insulating substrate;
disposing a temperature-characteristic-compensation element over said insulating substrate by applying thermistor-resistance paste over said insulating substrate at a position where said temperature-characteristic-compensation element is to be disposed so as to form a temperature-characteristic-adjusting resistor as said temperature-characteristic-compensation element; and
forming a first protective layer over said strain-resistance element.

28. The method according to claim 27, wherein
applying the metal-glaze-based paste over the insulating substrate comprises printing the metal-glaze-based paste over the insulating substrate,
forming the strain-resistance element at said position comprises applying a thermistor-resistance paste at said position,
forming the power electrode, the output electrodes, the ground electrode, and the circuit pattern over said insulating substrate comprises coating said insulating substrate with silver paste to form the power electrode, a pair of output electrodes, the ground electrode and the circuit pattern, and
forming the first protective layer over said strain-resistance element comprises applying a glass paste as the first protective layer.

29. The method according to claim 27, further comprising:
coupling a direct-current power source between said power electrode and said ground electrode; and
trimming said temperature-characteristic-adjusting resistor such that said pair of output electrodes each outputs the same amount of change corresponding to a change of a temperature surrounding said insulating substrate.

30. A method of manufacturing a strain detector, comprising:

applying a metal-glaze-based paste over an insulating substrate at a position where a strain-resistance element is disposed;

forming the strain-resistance element at said position;

forming a power electrode, output electrodes, a ground electrode and a circuit pattern over said insulating substrate;

disposing a temperature-characteristic-compensation element over said insulating substrate by applying thermistor-resistance paste over said insulating substrate at a position where said temperature-characteristic-compensation element is to be disposed so as to form a thermistor as said temperature-characteristic..compensation element; and forming a first protective layer over said strain-resistance element.

31. The method according to claim 30, wherein applying the metal-glaze-based paste over the insulating substrate comprises printing the metal-glaze-based paste over the insulating substrate, forming the strain-resistance element at said position comprises applying a thermistor-resistance paste at said position, forming the power electrode, the output electrodes, the ground electrode, and the circuit pattern over said insulating substrate comprises coating said insulating substrate with silver paste to form the power electrode, a pair of output electrodes, the ground electrode and the circuit pattern, and forming the first protective layer over said strain-resistance element comprises applying a glass paste as the first protective layer.

32. The method according to claim 30, further comprising:

mounting a compensation-value calculator over said insulating substrate for compensating an output of said strain-resistance element based on an output of said thermistor.

33. A method of manufacturing a strain detector, comprising:

applying a metal-glaze-based paste over an insulating substrate at a position where a strain-resistance element is disposed;

forming the strain-resistance element at said position;

forming a power electrode, output electrodes, a ground electrode and a circuit pattern over said insulating substrate;

disposing a temperature-characteristic-compensation element over said insulating substrate;

forming a first protective layer over said strain-resistance element; and forming a second protective layer over said first protective layer by baking one of a resin paste and glass paste, applied over said first protective layer, at about 200° C. for about 30 minutes.

34. The method according to claim 33, wherein applying the metal-glaze-based paste over the insulating substrate comprises printing the metal-glaze-based paste over the insulating substrate, forming the strain-resistance element at said position comprises applying a thermistor-resistance paste at said position, forming the power electrode, the output electrodes, the ground electrode, and the circuit pattern over said insulating substrate comprises coating said insulating substrate with silver paste to form the power electrode, a pair of output electrodes, the ground electrode and the circuit pattern, and forming the first protective layer over said strain-resistance element comprises applying a glass paste as the first protective layer.

35. A method of manufacturing a strain detector, comprising:

applying a metal-glaze-based paste over an insulating substrate at a position where a strain-resistance element is disposed;

forming the strain-resistance element at said position;

forming a power electrode, output electrodes, a ground electrode and a circuit pattern over said insulating substrate;

disposing a temperature-characteristic-compensation element over said insulating substrate;

forming a first protective layer over said strain-resistance element;

forming a nickel plate layer over said power electrode, said output electrodes, and said ground electrode; and forming a solder plate layer over said nickel plate layer.

36. The method according to claim 35, wherein applying the metal-glaze-based paste over the insulating substrate comprises printing the metal-glaze-based paste over the insulating substrate, forming the strain-resistance element at said position comprises applying a thermistor-resistance paste at said position, forming the power electrode, the output electrodes, the ground electrode, and the circuit pattern over said insulating substrate comprises coating said insulating substrate with silver paste to form the power electrode, a pair of output electrodes, the ground electrode and the circuit pattern, and forming the first protective layer over said strain-resistance element comprises applying a glass paste as the first protective layer.

37. The method according to claim 35, further comprising:

forming a slit by cutting off a portion of said circuit pattern prior to forming said nickel plate layer;

forming a slit electrode at said slit by coating said circuit pattern with silver paste prior to forming said nickel plate layer; and disposing a conductive member on said slit electrode after forming said nickel plate layer.

38. The method according to claim 37, wherein disposing the conductive member on said slit electrode comprises applying a conductive adhesive on said slit electrode.

39. A method of manufacturing a strain detector, comprising:

applying a metal-glaze-based paste over an insulating substrate at a position where a strain-resistance element is disposed;

forming the strain-resistance element at said position;

forming a power electrode, output electrodes, a ground electrode and a circuit pattern over said insulating substrate;

disposing a temperature-characteristic-compensation element over said insulating substrate;

forming a first protective layer over said strain-resistance element;

mounting a capacitor for coupling said power electrode to said ground electrode; and mounting capacitors for coupling said output electrodes to said ground electrode, respectively.

40. The method according to claim 39, wherein
applying the metal-glaze-based paste over the insulating substrate comprises printing the metal-glaze-based paste over the insulating substrate,
forming the strain-resistance element at said position comprises applying a thermistor-resistance paste at said position,
forming the power electrode, the output electrodes, the ground electrode, and the circuit pattern over said insulating substrate comprises coating said insulating substrate with silver paste to form the power electrode, a pair of output electrodes, the ground electrode and the circuit pattern, and
forming the first protective layer over said strain-resistance element comprises applying a glass paste as the first protective layer.

* * * * *